Jan. 8, 1946.   M. ASHPES   2,392,567
OUTBOARD MOTOR CONVERTIBLE FOR BOATS OR BICYCLES
Filed Nov. 17, 1943
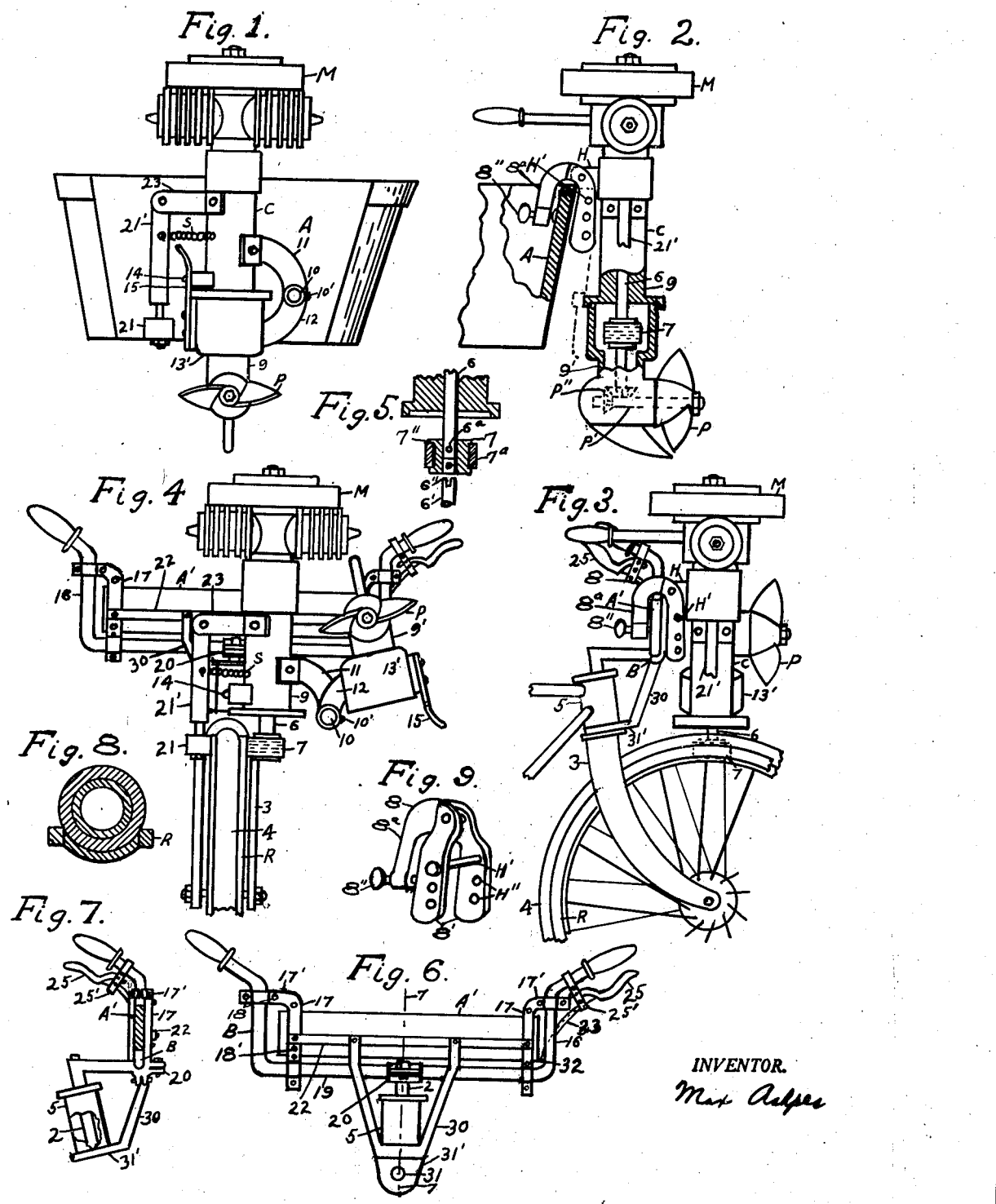
INVENTOR.
Max Ashpes Patented Jan. 8, 1946

2,392,567

UNITED STATES PATENT OFFICE 2,392,567

OUTBOARD MOTOR, CONVERTIBLE FOR BOATS OR BICYCLES

Max Ashpes, New York, N. Y.

Application November 17, 1943, Serial No. 510,844

5 Claims. (Cl. 180—31)

This invention relates to outboard motors, such as used for driving small boats, and has to do more particularly with some added features thereof, whereby the motor is quickly convertible to also drive a bicycle.

It is an object of the invention to supply the bicycle with some of the parts of the improvement to remain on the bicycle, since these parts of the improvement are not required when the motor is driving the boat, and likewise some of the parts not needed on the bicycle may remain on the boat.

It is another object of the invention, when making a trip with the bicycle, to where the boat is docked, to transfer the motor to the boat, to continue the trip and storing the bicycle in the boat, or in the boat house during the trip, and on returning there the boat is docked in the usual manner, the motor however is removed to again attach the same to the bicycle to take the trip home, where the same is more often used and can be cared for.

Other objects of the invention will be referred to as this description proceeds, and more fully point out other features thereof and shown in the accompanying drawing, in which Fig. 1 is a rear view of a boat with a conventional type of outboard motor in position thereon, showing my improvements with the parts in position to drive the boat.

Fig. 2 is a side elevation, showing the rear end portion of the boat with the parts in position shown in Fig. 1, some of the parts shown in section.

Fig. 3 is a side elevation, similar to Fig. 2 with the motor applied to the bicycle, with the parts in position to drive the same.

Fig. 4 is a front view of the bicycle with the motor supported on the handle-bars, also showing how the bicycle is driven.

Fig. 5 is a detail view, showing a longitudinal section, somewhat enlarged, a friction drive wheel and a coupling member thereof.

Fig. 6 is a detail view showing the structure to which the motor is attached to the bicycle handle-bar, to swing with the front wheel when steering the bicycle.

Fig. 7 is a cross sectional view, taken on line 7—7, of Fig. 6.

Fig. 8 is an enlarged cross sectional view of a bicycle wheel showing side rings attached for engaging the friction drive wheel and presser roller, to prevent wear on the tire.

Fig. 9 is a detail view of a clamp bracket, to clamp the motor to the boat or bicycle.

As shown, the outboard motor M of any well known type adapted to drive small boats is here utilized with improved attachments thereof, to serve as a convertible motor, arranged to be quickly applied to a boat, and in the same manner quickly removed and applied to a bicycle.

Motors of this type require much care when used for the boat alone, since much of the time boats are docked and covered in some manner to be protected from the weather, and for this reason are often removed from the boat to be stored away in near-by localities for which a nominal charge is exacted. It also requires time and trouble to arrange in proper order the details, to attach and make ready for the trip with the boat. This sort of trouble, the storage of the motor and care for same is much overcome by the use of the motor for both the boat and the bicycle, since the motor may be attached to the bicycle where for the greater part of the time, more use for the same is had, and also for riding to the boat where the motor is quickly attached, and the bicycle during the boat trip may be stored in the boat, or boat house.

I attain these results by arranging a supporting board so attached to the handle-bars of the bicycle to form a counterpart of the back board at the back end of the boat, to which the outboard motor is clamped in a like manner to either the boat or the bicycle. The back board of the boat is indicated at A, and the supporting board of the bicycle at A'.

The motor M is carried by the handle-bar B, to swing with the shaft 2 of the front fork 3 in which the front wheel 4 is mounted in the bearing 5 of the bicycle frame to swing with the handle-bar when steering the bicycle.

The drive shaft 6 of the motor carries a friction drive wheel 7 that is fixed to the shaft 6 at the lower end thereof and is so positioned to engage the front wheel 4 at one side to drive the same in any position thru which the shaft 2 and fork 3 are rocked, since the motor, supported on the handle bar swings with the wheel 4 for the friction wheel to be always in contact therewith thru the steering operation. This will be better understood after describing the change required to the motor whereby either the boat or the bicycle is driven.

The outboard motor as generally constructed for use in driving small boats includes a cast base portion C, in the form of a comparatively long tubular depending shaft with a flanged top to which the motor casing is bolted, containing the cylinders and crank mechanism that rotate the shaft 6, supported in vertical position extending down thru bearings in the tubular base to drive the propeller indicated at P on a short shaft P' at right angles thereto driven by miter gears P'' shown in Fig. 2, in dotted lines. The tubular base adjacent the top and rear side thereof has attached thereto a clamping bracket 8 which is hinged to an ear of the base, as at H, see Fig. 2, for the base to swing on and to be adjusted to different angular positions by a stop pin H' which is inserted in any one of a series of holes H'', see Fig. 9. The propeller it will be noted when in motion will hold the base and thereby the motor against the adjustable pin, as indicated by the dotted line in Fig. 2. The clamping bracket by two depending arms provides a flat face portion 8' on each side of the clamping screw 8'', the two arms lie against the back of the back board A, and an overhanging arm 8a at the front between said arms thru which the clamping screw 8'' extends to clamp the base to the boat board A. By this means the entire motor mechanism is clamped into position, the propeller when in motion draws the structure against the pin H' as above stated, and in the same manner when the motor is on the bicycle on the board A', which is a counterpart of the board A of the boat. While I have described the construction for the boat, minor changes are required to make the motor convertible for alternate use for the boat and bicycle. This is done by severing the tubular base and the shaft 6, at a point where the friction drive wheel 7 is fitted to the shaft 6, to be in proper contact with the side rim R of the front wheel 4 of the bicycle, forming an upper part 9 of this base, see Figs. 3 and 4. Having determined this, the friction wheel 7 is fitted to the shaft and pinned as at 6a at the upper end thereof, to use the lower end of the bore as an open pocket thru which a cross pin 7' forms one part of a clutch member. The friction wheel is grooved as at 7'' to receive therein a rubber ring 7a to contact the tire of the wheel 4, or the ring R shown in Fig. 8. The lower part severed from the base 9, and here indicated at 9' is fitted to swing from an idle position as in Fig. 4, where it clears the friction drive wheel 7, to the position shown in Fig. 2, the shaft 6' thereof is fitted with a slotted end 6'' to engage the cross pin 7' within the friction wheel 7. The two part base 9 and 9' are joined by a hinge connection, so positioned on a hinge pin 10 for the lower part 9' thereof to swing outward to one side, see Fig. 4. When the motor is on the bicycle the propeller is swung outward to one side to expose the friction drive wheel 7, to contact either the front wheel 4 or the ring R thereof, when this ring is employed. In the other position as in Fig. 1, when driving the boat it is swung into coupling connection and in alignment with the shaft 6, to drive the propeller shaft 6'. The hinge bracket 11 of the upper part 9, is bolted thereto and has a single arm curved downward with a hub end, thru which the pin 10 extends from each side and is clamped by a set screw 10'' to hold the pin firmly to support the lower part with a hinge bracket 12, which has two arms the hubs of which are bored to swing on the pin 10. When the hinged members are in the closed position they are locked by a pin 14 at one side and lower end of upper base part 9 which is engaged by a spring 15, fixed to a cupped portion 13' of the casing. The motor is supported on the handle-bar B to swing with the front wheel 4 so the friction wheel 7 is always in contact therewith during the steering operation. While the motor may be mounted in any other manner, I prefer to mount it on the board A' which, being a counterpart of the back board A of the boat and is supported between the upstanding portions 16 of the handle-bar by metal straps 17, a pair at each side bolted at each end to the uprights 16 and the lower straight part 19. The bent ends 17' of the straps extend to serve as clamps between which the upstanding portions 16 are clamped by screws 18, the lower straight connecting part 19 to which the shaft 2 is fixed in the usual manner by a fitting 20 in the form of a clamp and is a part of the shaft 2, to which also the front fork 3 is connected. A brace member 30 is attached to a cross bar 22 that is riveted at each end to the straps 17 to support the top of the brace member 30 which reaches downward having a perforation 31 in an inward bent part 31' thereof, for the upper end of the forked shaft 2 to pass thru, to brace the upper structure and swing with the steering mechanism of the bicycle. The friction wheel 7 is held against the front wheel 4 by a presser roller 21 mounted on a swinging arm 21' pivoted on a bracket 23, extending from the base 9. A coil spring S connects swinging arm 21' to base 9 in a manner which exerts a clamping pressure between the presser roller 21 and the friction wheel 7, thereby making a positive frictional contact between the front wheel 4 and the friction wheel 7. The board A' is loosely mounted between the straps 17 and is bolted to same at one end as at 18', said bolt acting as a pivot for the board to swing freely at the other end between the metal straps 17, for a limited amount only between bolts 10 at the front thereof, a metal fitting 32 is connected to the front lower end of the board in any desirable manner to control the pressure of the friction wheel 7 against the tire, or ring R of wheel 4. The hand grip lever 25 which is pivoted on a bracket 25' clamped to one of the handles as at 25 and is connected with the lower end of the board A' and said clip 32 by a flexible member such as wire or flat spring band, to serve as a link 33, see Fig. 6. When hand grip 25 is squeezed against handle as stated, the board A' is tilted upward thereby rocking the motor clamped to the board so the friction drive wheel is moved away from wheel 4, and roller 21 has been pulled tighter by spring S against wheel 4 but has no effect on wheel 4 at this time, since it is only used to draw the friction wheel 7 against the front wheel by the spring S, when the pressure is released on hand grip 25, the weight of the motor and the spring S act to release grip 25 to its open position, allowing the board A' to assume its original position to make positive contact of the friction wheel 7 and bicycle wheel 4. From the foregoing it will be noted, perfect control is had to stop and start the bicycle without stopping the motor. The motor is provided with the usual devices for starting and stopping the same, and are so located to be readily and handily reached for both the boat and the bicycle. In Fig. 8, I show protecting metal rings indicated at R applied to each side of the front wheel, for the friction wheel 7 and the presser roller 21 to engage instead of riding against the tire. It will be understood however that either way may be employed. The rings R are readily applied by spot welding, when the tire rim is metal as is often the case. From the foregoing it will be obvious I have devised a simple means for use of the outboard motor in making the same convertible for both the boat and the bicycle, and it is believed to be novel to support the motor as shown applied to the steering mechanism of the bicycle to swing therewith and drive the same as a front wheel drive.

The operation of the invention has been referred to in what has been above said, and it is believed the same will be entirely plain without further description. Certain of the advantages of the invention have also been pointed out in what has been said and others will be readily seen without further description.

I do not limit myself to the particular details of construction which have been set forth in the foregoing specification and illustrated in the accompanying drawing, as the same refers to and set forth only certain embodiments of the invention, and it is obvious that the same may be modified, within the scope of the claims hereof, without departing from the spirit and scope of the invention.

Having described my invention, I claim:

1. In an outboard motor arranged for alternate use to drive a boat or a bicycle, as described, including in combination a back board of the boat and a counterpart of said board carried on the handlebar of the bicycle, a two part supporting base of the motor, the upper part of which carries the motor, and an ear adjacent the top of said base and extending rearward thereof, a clamp bracket pivoted to said ear between a bifurcated portion thereof, said bracket having two spaced depending arms with flat faces to lie against said back board of the boat or said counterpart board of the bicycle, a clamping arm forward of said flat faced arms spaced therefrom to admit said boards therebetween, and a clamping screw in said clamp arm to clamp the upper base part to either of said boards to support the motor and base to swing on said pivot, means connected with the bracket to limit the swinging movement including a stop pin fitting in any one of a series of perforations in said flat faced arms to limit the forward movement toward the board of said base.

2. In the combination of claim 1 wherein the motor and said upper part clamped to the boat or bicycle include a drive shaft of the motor passing thru and extending below a flanged bottom of said base, a friction drive wheel fixed to said drive shaft end, the bore of which extends beyond the shaft to form a pocket in said wheel, a cross pin passing thru said pocket for coupling with a lower section of said drive shaft mounted in the other part of the base constituting a lower base part, a propeller mounted on a propeller shaft transversely disposed to said lower drive shaft and driven by a pair of miter gears of which one is fixed on said propeller shaft and is driven by the other which is fixed on the lower drive shaft in said lower base part, the lower drive shaft end extending upward thru the cup shaped lower base housing thereof into said pocket of the friction drive wheel, the end of said drive shaft being slotted for coupling connection with said cross pin in the pocket of said friction wheel of the upper base part, means to swing the lower base part with the propeller to an inactive position when mounting the motor on the bicycle, including hinge brackets of curved form, one a single arm fixed to the upper base part and other having two arms to straddle said single arm formed integral with said lower cup-shaped housing, each arm having perforated hubs into which a hinge pin fits, said hinge pin being held firm by a set screw in the hub of said single arm and said hinge pin supporting said lower base part at one side on which it swings, means to lock said lower base part in alignment with said upper base part to drive the propeller shaft when the motor is mounted on the boat including a spring arm fixed to the cup shaped housing and having a perforation in its end to engage a lock pin which is fixed to the lower end of said upper base on the side opposite said hinge.

3. An outboard motor arranged for alternate use to drive a boat or bicycle, as described, the combination including for the bicycle, a board supported on the handle-bar to which the motor is mounted on a two part base, the upper part clamped to the board and the other, a lower part hinged to the upper part and swung aside to expose a friction drive wheel fixed to the end of the motor drive shaft to engage the side of the front wheel of the bicycle, said front wheel mounted between the forked end of a rock shaft to the other end of said rock shaft passing up thru a bearing of the bicycle frame and at the top the handle-bar clamped to a central clamp thereof, said handle-bar forming a part of the steering mechanism of the bicycle, means to support the board on the handle-bar including metal straps clamped at the front and back at each end of upturned portions of the handle bar, and by a right angle bend downward of said straps to a horizontal straight part of handle-bar below extending each side of said central clamp between which said board is freely mounted, said straps clamped by screws to tightly draw the straps toward each other each side the handle bar at the top of upturned ends and the bottom horizontal part, said board pivoted at one end at the lower corner thereof, by a bolt passing thru the straps acting as a pivot pin for the board to be rocked upward at the other end by a hand grip lever pivoted to a clamp bracket mounted on the handle-bar adjacent the handle at one end, said hand grip lever having a flexible connecting member fixed thereto, and to a metal fitting attached to the lower corner of the board opposite the pivot, a presser roller supported on a depending arm pivoted to a bracket extending from said upper motor base on the side opposite said hinge for the roller to engage the side of the front wheel opposite said friction drive wheel, a pull spring fixed to the motor base and said depending arm, whereby with the hand grip lever in the open and normal position the weight of the motor and said spring pulling the friction drive wheel to engage the front wheel, on squeezing the hand grip lever the board with the motor thereon will swing upward and the motor slightly to one side causing said friction drive wheel to disengage the side of the front wheel so the motor may be running or idle, substantially as specified.

4. In an outboard motor arranged for alternate use to drive a boat or bicycle as described, the combination including for the bicycle the steering mechanism, consisting of the front part of the frame in which the bearing supports the rock shaft with a forked end in which the front wheel is mounted to be rocked and the handle bar connected to the top of said rock shaft to rock the same, means to support the motor on the handle bar, including a board to which the motor is clamped, said board supported between straps clamped at each end, at the front and back of upturned portions of the handle bar and to the lower horizontal part of handle-bar, said board pivoted at one end by a bolt passing thru said straps and said board for movement of said board at the other end, means to brace the structure supporting said board with the motor thereon, including a cross bar fixed to said straps at the front at each end of the cross bar, and a brace member having two arms attached to said cross bar, said arms reaching downward with a perforation in an inward bent part thereof, thru which the shaft end of the forked rock shaft passes upward thru said perforation for the bent end of said brace to be supported between the bottom of the bearing and said forked end.

5. In an outboard motor arranged for alternate use to drive a boat or a bicycle as described, the combination including for the bicycle, the front wheel, a motor supported on the upper part of a two part base, the lower base part hinged to said upper base part and swung aside to expose a friction drive wheel fixed to the end of the motor shaft to drive said front wheel, said motor mounted on a board supported on the handle-bar of the bicycle, a hand grip lever having a flexible connection with said board, a presser roller mounted on the end of a depending arm pivoted to a bracket extending from said upper base, a pull spring fixed to said upper base and said arm for the presser roller to engage said front wheel at the side opposite said friction wheel to draw the friction wheel against the bicycle wheel to drive the same, means connected with the front wheel to prevent wear of the tire, including the metal rim on which the tire is mounted, extensions of said rim at each side thereof reaching outward and having flat faces facing outwardly thereof for the friction wheel when said hand grip lever is open to engage said flat face at one side and said presser roller said flat face on the opposite side of the wheel.

MAX ASHPES.